(12) United States Patent
Cooper et al.

(10) Patent No.: US 9,551,983 B2
(45) Date of Patent: Jan. 24, 2017

(54) ACTIVITY SET MANAGEMENT IN A MANUFACTURING EXECUTION SYSTEM

(71) Applicant: Rockwell Automation Technologies, Inc., Mayfield Heights, OH (US)

(72) Inventors: David Cooper, Cedar Park, TX (US); Kevin Chao, Mountain View, CA (US); Keith Chambers, Scott's Valley, CA (US); Richard Sze, Saratoga, CA (US); Crisler Moor, San Jose, CA (US); Brandon E. Henning, Palmyra, VA (US); Suryanarayana Murthy Bobba, Los Altos, CA (US)

(73) Assignee: Rockwell Automation Technologies, Inc., Mayfield, OH (US)

( * ) Notice: Subject to any disclaimer, the term of this patent is extended or adjusted under 35 U.S.C. 154(b) by 592 days.

(21) Appl. No.: 13/676,973

(22) Filed: Nov. 14, 2012

(65) Prior Publication Data

US 2013/0123963 A1    May 16, 2013

Related U.S. Application Data

(60) Provisional application No. 61/560,214, filed on Nov. 15, 2011.

(51) Int. Cl.
| | | |
|---|---|---|
| G05B 19/02 | (2006.01) | |
| G06Q 10/06 | (2012.01) | |
| G06Q 50/04 | (2012.01) | |

(52) U.S. Cl.
CPC .............. *G05B 19/02* (2013.01); *G06Q 10/06* (2013.01); *G06Q 50/04* (2013.01); *Y02P 90/30* (2015.11)

(58) Field of Classification Search
None
See application file for complete search history.

(56) References Cited

U.S. PATENT DOCUMENTS

| 6,104,281 A | 8/2000 | Heinrich et al. |
|---|---|---|
| 6,615,199 B1 | 9/2003 | Bowman-Amuah |
| | (Continued) | |

FOREIGN PATENT DOCUMENTS

| EP | 1072967 A2 | 1/2001 |
|---|---|---|
| EP | 1906623 A1 | 4/2008 |

OTHER PUBLICATIONS

European Search Report for European Patent Application No. EP12192874 dated Feb. 6, 2013, 6 pages.
(Continued)

*Primary Examiner* — Mohammad Ali
*Assistant Examiner* — Saad M Kabir
(74) *Attorney, Agent, or Firm* — Amin, Turocy & Watson, LLP

(57) ABSTRACT

A Manufacturing Execution System (MES) is provided for execution of workflows in response to specified business objectives. The MES system can maintain a library of activity sets representing industry-specific workflows that can be selected and executed in order to satisfy business-driven goals. The activity sets can comprise both business-level and control-level operations, and can be configured using an intuitive graphical interface that mitigates the need for low-level programming by the end user. In response to receipt of a request from a business-level system such as an ERP system, the MES system can match the request to an activity set, and subsequently execute the workflow defined by the activity set to facilitate satisfying the request.

20 Claims, 15 Drawing Sheets

(56) References Cited

U.S. PATENT DOCUMENTS

| | | | |
|---|---|---|---|
| 7,317,959 | B2 | 1/2008 | Pfander et al. |
| 7,778,717 | B2 | 8/2010 | Bachman et al. |
| 7,934,252 | B2 | 4/2011 | Chung et al. |
| 7,974,723 | B2 | 7/2011 | Moyne et al. |
| 8,676,721 | B2 | 3/2014 | Piovesan et al. |
| 2002/0138316 | A1 | 9/2002 | Katz et al. |
| 2003/0149608 | A1 | 8/2003 | Kall et al. |
| 2004/0117358 | A1 | 6/2004 | von Kaenel et al. |
| 2005/0160412 | A1 | 7/2005 | Thurner |
| 2005/0267882 | A1 | 12/2005 | Aupperlee et al. |
| 2006/0106473 | A1 | 5/2006 | Enright et al. |
| 2008/0154412 | A1 | 6/2008 | Steinbach et al. |
| 2009/0043404 | A1 | 2/2009 | Moor et al. |
| 2009/0088871 | A1 | 4/2009 | Moor et al. |
| 2009/0276270 | A1* | 11/2009 | Karnataka ......................... 705/8 |
| 2010/0191579 | A1 | 7/2010 | Sudarshan et al. |
| 2010/0205271 | A1 | 8/2010 | Callaghan |
| 2011/0258262 | A1 | 10/2011 | Bezdicek et al. |
| 2011/0258359 | A1 | 10/2011 | Bezdicek et al. |

OTHER PUBLICATIONS

European Search Report for European Patent Application No. EP12192876 dated Feb. 6, 2013, 6 pages.

European Search Report for European Patent Application No. EP12192875 dated Apr. 3, 2013, 14 pages.

Mesa International. "MES Explained : A High Level Vision", White Paper No. 6, Sep. 1997, 25 pages.

Karnouskos, et al. "Integration of Legacy Devices in the Future SOA-Based Factory", Information Control Problems in Manufacturing, vol. 13, No. 1, Jun. 2009, 6 pages.

Jammes, et al. "Service-oriented architectures for devices—the SIRENA view", 2005 3rd IEEE International Conference on Industrial Informatics, Perth, Australia, Aug. 2005, 8 pages.

Feldhorst, et al. "Integration of a legacy automation system into a SOA for devices". IEEE Conference on Emerging Technologies & Factory Automation, Sep. 2009, 8 pages.

Office Action dated Sep. 24, 2014 for U.S. Appl. No. 13/677,019, 38 pages.

European Search Report for European Patent Application No. 12192874.1 dated Feb. 5, 2014, 6 pages.

Final Office Action dated Feb. 6, 2015 for U.S. Appl. No. 13/677,019, 36 pages.

Burnham, "Using ISO/IEC 19770-2 Software Identification Tags to Enhance Software Asset Management", White Paper, Agnito Advisors, 2009. Retrieved on Mar. 13, 2015, 8 pages.

Office Action dated Mar. 13, 2015 for U.S. Appl. No. 13/677,039, 250 pages.

Baina et al., "A Product Oriented Modelling Concept, Holons for Systems Synchronisation and Interoperability", Enterprise Information Systems, 8th International Conference, ICEIS 2006, May 27, 2006, selected papers, Springer, Berlin, Retrieved on Mar. 13, 2015, 8 pages.

OMAC Packaging Workgroup (ConnectPack). "Guidelines for Packaging Machinery Automation", version 3.1, release date May 11, 2006, Open Modular Architecture Controls, OMAC Users Group. Retrieved on Mar. 13, 2015, 135 pages.

Wybron, Inc. "Infogate User Manual", Model 4210CD Infogate software (Version 2.2), Model 4210 Infogate gateway, Manual issue date: Apr. 7, 2009. Retrieved on Mar. 13, 2015, 49 pages.

Giriraj, et al., "Layerless Manufacturing & SAP—Creating Responsive Shop Floor In The Supply Chain", International Journal of Engineering and Technology vol. 2(2), 2010, Retrieved on Mar. 13, 2015, 6 pages.

Office Action for U.S. Appl. No. 13/676,998, dated Oct. 23, 2015, 40 pages.

Office Action for U.S. Appl. No. 13/677,039, dated Oct. 7, 2015, 35 pages.

Su, X., et al., "On the Identification Device Management and Data Capture via WinRFID 1 Edge-Server," IEEE Systems Journal, Dec. 2007, vol. 1, No. 2, pp. 95-104.

Grauer, M., et al., "An Approach for Real-Time Control of Enterprise Processes in Manufacturing using a Rule-Based System," MKWI 2010—Enterprise Resource Planning und Transformation von ERP-Systemen, pp. 1511-1522, Information Systems Institute, University of Siegen.

Office Action for U.S. Appl. No. 13/677,019, dated Nov. 3, 2015, 36 pages.

Office Action dated Jul. 8, 2015 for U.S. Appl. No. 13/677,019, 38 pages.

European Search Report for European Patent Application No. EP12192875 dated Apr. 21, 2016, 6 pages.

Office Action dated Jun. 4, 2015 for European Application No. EP12192876.6-1955 7 pages.

Office Action for U.S. Appl. No. 13/676,998, dated Jul. 1, 2016 29 pages.

Office Action for U.S. Appl. No. 13/677,039, dated Aug. 11, 2016, 49 pages.

Juels, A., "RFID Security and Privacy: A Research Survey," IEEE Journal on Selected Areas in Communications, Feb. 6, 2006, vol. 24, Issue 2, pp. 381-394.

Office Action for U.S. Appl. No. 13/676,998, dated Jul. 1, 2016, 29 pages.

* cited by examiner

ACTIVITY SET MANAGEMENT IN A MANUFACTURING EXECUTION SYSTEM

RELATED APPLICATIONS

This application claims the benefit of U.S. Provisional Patent Application Ser. No. 61/560,214, filed on Nov. 15, 2011, and entitled "ACTIVITY SET MANAGEMENT IN A MANUFACTURING EXECUTION SYSTEM." The entirety of this application is incorporated herein by reference.

TECHNICAL FIELD

The subject application relates generally to industrial control, and, more particularly, to the use of graphical activity sets to perform Manufacturing and Execution System (MES) functions in response to specified business objectives.

BACKGROUND

Industrial controllers and their associated control programming are central to the operation of modern industrial automation systems. These controllers interact with field devices on the plant floor to carry out controlled processes relating to such objectives as manufacture of a product, material handling, batch processing, waste water treatment, and other such processes. Industrial controllers store and execute user-defined control programs to effect decision-making in connection with the controlled process. Such programs can include, but are not limited to, ladder logic, sequential function charts, function block diagrams, structured text, or other such platforms.

The various control systems that make up an enterprise are sometimes collectively managed by a Manufacturing Execution System (MES), which monitors real-time data from the plant floor and issues control management instructions in view of higher level business considerations, such as order management, resource management, inventory, scheduling, etc.

Plant floor operations, including control of industrial processes by the industrial controllers described above, represent one component of a larger business enterprise. On a higher level, business operations such as financial analysis, marketing, sales, order management, long term business planning, resource management, inventory management, and the like collectively represent another element of the enterprise. Many organizations employ an Enterprise Resource Planning (ERP) system or similar business system to correlate and manage these business level functions in a cohesive manner.

Although business level and plant floor level operations are related to and dependent upon one another, the two levels are often only loosely integrated, with slow (e.g., non-real-time, non-automated) information exchange between the two. Moreover, efforts to integrate higher level business systems with plant-side control can be hindered by the need for specialized programming code, necessitating involvement of experienced programmers or IT personnel who may have limited understanding of both the business-side and plant-side operations compared with management or factory personnel.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to an MES system and associated ERP gateway that facilitate automated interaction between business-level and control-level systems. To this end, industry- and process-specific activity sets can be provided that define workflows capable of execution by the MES system. These activity sets can encompass both business-level operations and control-level operations, thereby facilitating workflow coordination between all levels of an enterprise in the service of satisfying a particular business objective. Activity sets can be viewed and modified using an intuitive graphical interface, thereby allowing non-programmers to build meaningful MES workflows without the assistance of an experienced programmer.

According to one or more embodiments, an MES system can include a library of generalized activity sets corresponding to executable control and/or business workflows. These activity sets can be classified according to industry, process, and any suitable subcategories, thereby allowing industry-specific rules or standards to be encoded in the activity sets. Generalized activity sets can be customized for use with a particular control context through tag binding. When a message defining a business goal or objective is received by the MES system from a business-level system (e.g., an ERP system), the message can be analyzed and matched to an activity set by the MES system, which can then execute the selected activity set to facilitate satisfaction of the business objective. Relevant reporting can be provided to the business level in connection with execution of the activity set at a desired degree of granularity. Any suitable analysis technique can be employed to match the business request with a suitable activity set, including simulation of activity sets in view a current control context.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
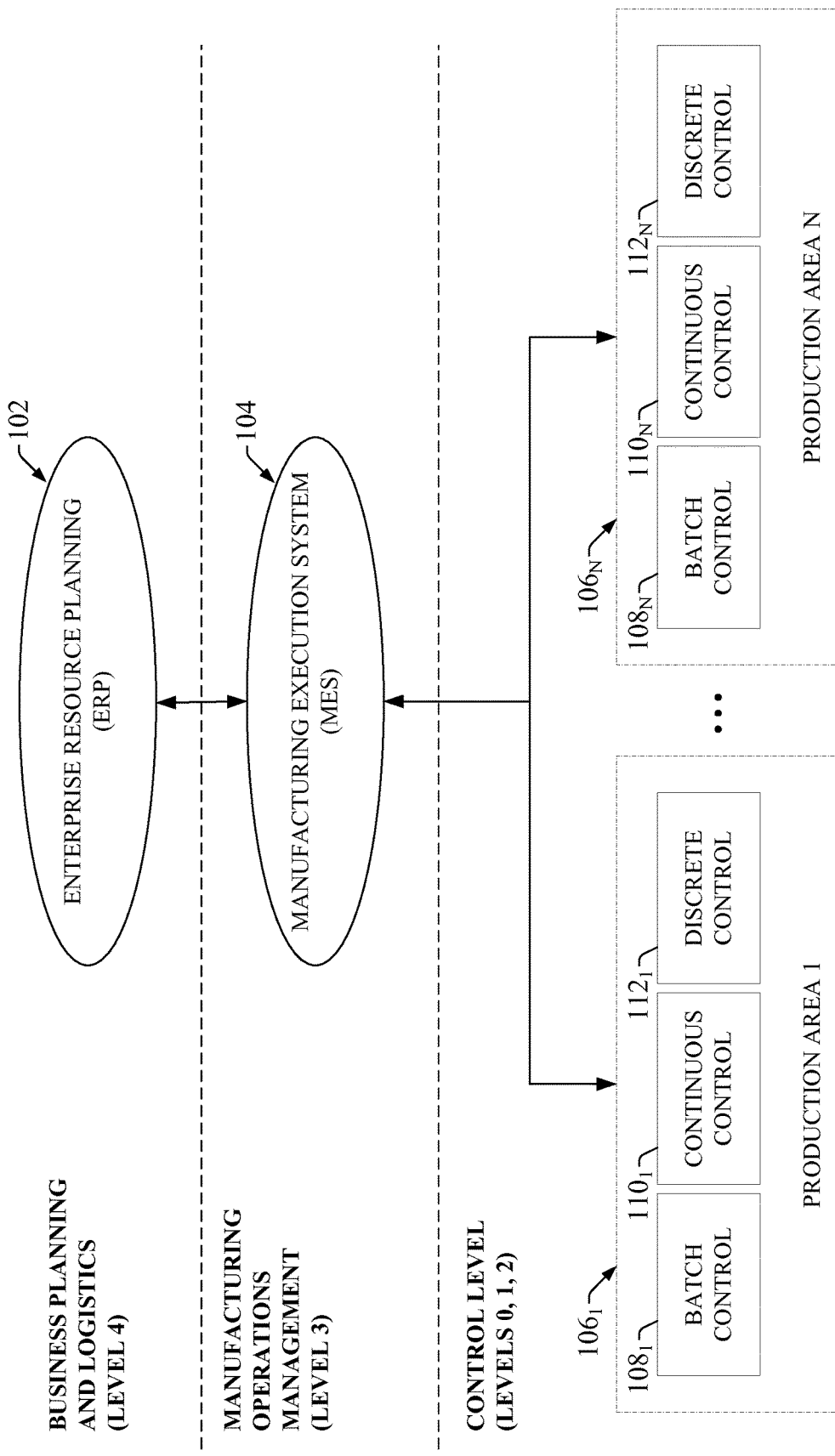
FIG. 1 is a high-level overview the relationships between an ERP system, an MES system, and control systems of an exemplary enterprise.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of the relationships between an ERP system 102, an MES system 104, and control systems 108, 110, and 112 of an exemplary enterprise. In accordance with ISA-95 definitions, these entities are depicted as residing, respectively, on a Business Planning and Logistics level (Level 4), a Manufacturing Operations Management level (Level 3), and a Control level (Levels 0-2). ERP system 102 can be used to integrate and collectively manage high-level business operations, such as finance, sales, order management, marketing, human resources, or other such business functions. ERP system 102 can serve as a high-level business planning tool that, stated broadly, is directed to longer-term business decision-making relative to operations at the control level, which generally focus on substantially real-time production concerns.

One or more control systems 108-112 can operate within respective production areas $106_1$-$106_N$ at the control level. Exemplary types of control systems can include, but are not limited to, batch control systems $108_{1-N}$ (e.g., mixing systems), continuous control systems $110_{1-N}$ (e.g., PID control systems), or discrete control systems $112_{1-N}$. These control systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motor control signals, and the like. The control program can comprise any conceivable type of code used to process input signals read into the controller and to control output signals generated by the controller, including but not limited to ladder logic, sequential function charts, function block diagrams, structured text, or other such platforms.

Manufacturing Execution System (MES) 104 can monitor and manage control operations on the control level given higher-level business considerations. An exemplary MES system can be provided with information relating one or more of scheduling, work order management and execution, business operating procedures, resource management, quality criteria, inventory management, and the like. Given this high-level business information, MES system 104 can monitor control systems 108, 110, and/or 112 and issue control management instructions designed to align operations at the control level with medium-term or long-term goals of the organization as a whole.

Production areas $106_1$-$106_N$ can represent different areas within a single plant, corresponding, for example, to different segments of a given manufacturing process, different products, etc. Alternatively or in addition, Production areas $106_1$-$106_N$ can represent facilities located at different geographical locations associated with a given enterprise. In such architectures, a central MES system 104 can monitor and manage multiple control systems at different geographically diverse facilities, providing coordination between the facilities in view of a common business objective.

Figure 2:
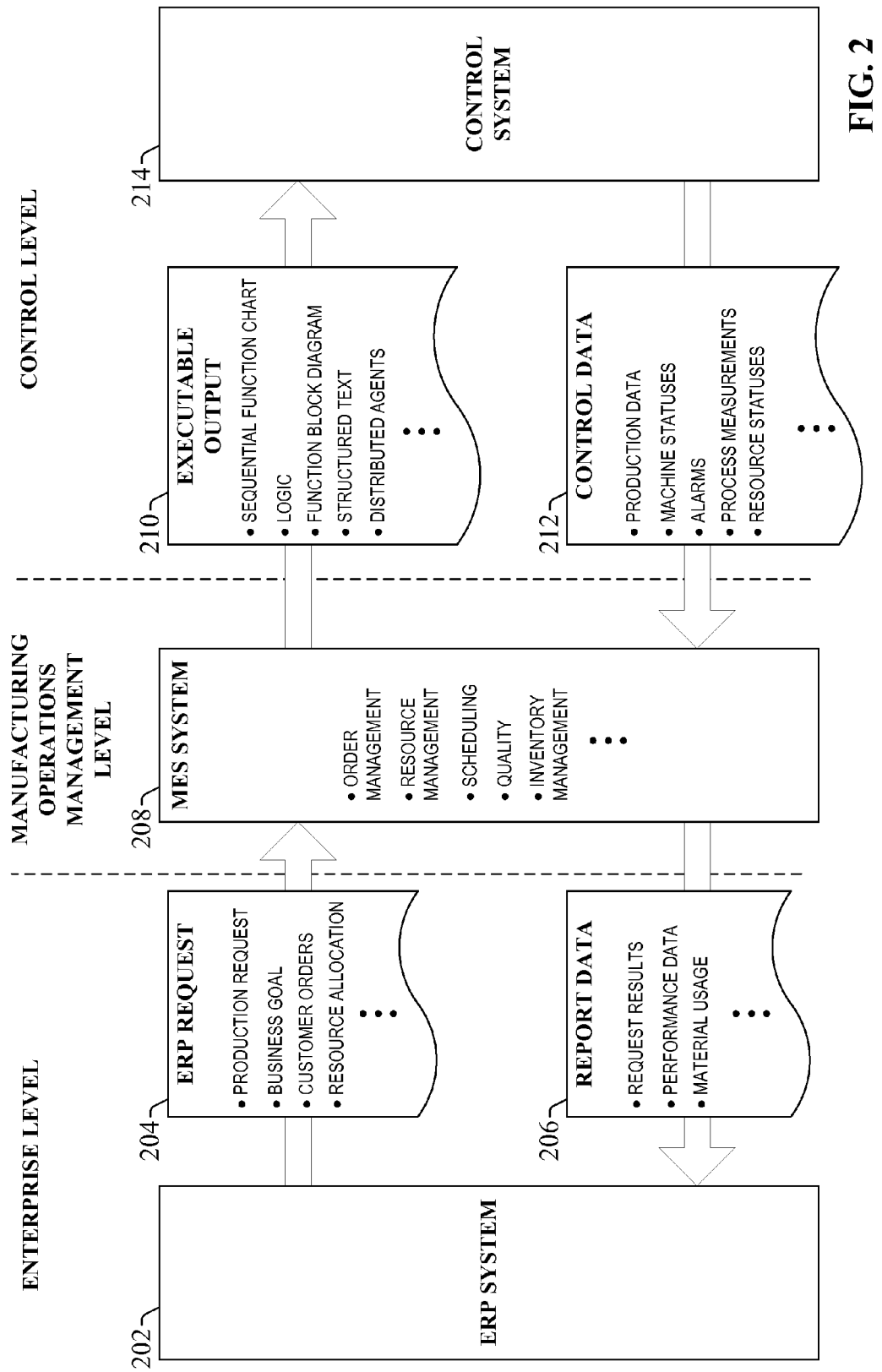
FIG. 2 is a block diagram of exemplary data flows between an ERP system, an MES system, and a control system.

One or more embodiments of the present innovation can include an MES system capable of receiving a request from an ERP system and mapping the request to one or more executable instructions for delivery to one or more control systems, thereby implementing the request on the plant floor in a manner deemed suitable by the MES system given its knowledge of the control system architecture, statuses, schedules, etc. FIG. 2 illustrates exemplary data flows between the ERP system, the MES system, and a control system according to one or more embodiments of the present disclosure. It is to be appreciated that control system 214 can comprise a single self-contained control system or multiple distributed control systems. Moreover, control system 214 can span multiple geographic locations, where individual control systems at the multiple locations report to a common MES system 208.

ERP system 202 (or a similar business system) can issue ERP requests 204 to MES system 208. Such requests can include, but are not limited to, production requests, business goals, customer order information, resource allocation requests, or other such requests. A production request can comprise, for example, a request from the ERP system to produce a specified quantity of a product. In such cases, ERP system 202 may not have knowledge of the particular control architecture or statuses of control system 214, machine availability, work schedules, or other plant floor variables involved in fulfilling the request. Given its ability to monitor and maintain these control-side factors, MES system can receive this production request from the ERP system 202 and determine one or more possible workflows for producing the desired amount of the indicated product based on an analysis of the overall control system architecture, machine availabilities, work schedules, or other plant floor variables involved in fulfilling the request. For example, the MES system can determine which machines are available and capable of producing the desired amount of the product, a suitable control strategy to be executed by the machines to satisfy the order (e.g., a batching sequence, a number of batches that must be run to produce the desired amount, etc.). The ERP can then transform a suitable workflow into an output executable by the control system to implement the workflow, using techniques to be described in more detail infra. Upon completion of (or during) the workflow, the MES system can provide the ERP system with report feedback at a desired level of granularity.

A business goal can comprise more complicated request involving correlation of a plurality of factors. For example, the ERP system can issue a request to the MES system 208 to minimize energy consumption for the plant as a whole during a specified range of hours, while simultaneously maximizing production of an indicated product given the energy constraint. As with the production request, this request can be processed by MES system 208 and mapped to an appropriate control system workflow. Other exemplary ERP requests 204 can include customer order requests, resource allocation requests, or any other business request generated by ERP system 202.

As noted above, MES system 208 can map incoming ERP request 204 to a suitable workflow for execution by the MES system. In connection with generating this workflow, MES system can identify machines or devices that can be leveraged to fulfill the business request, as well as their associated controllers. MES system 208 can then translate the workflow to an executable output 210 capable of execution by the identified controllers. This executable output 210 can comprise any suitable format understandable by the controllers, including, without limitation, sequential function charts, ladder logic, function block diagrams, structured text, distributed control agents, and the like. Executable output 210 can also comprise control output signals mapped to tags or other I/O associated with the controllers.

In addition to providing workflow instructions, MES system 208 can monitor and receive control data 212 from control system 214. Examples of such control data include production data, machine statuses, alarms, process measurements (e.g., telemetry values), resource statuses, or other data made available by control system 214. Among other uses, MES system 208 can employ this control data to update system models used to select suitable workflows. MES system 208 can also employ the control data 212 to generate report data 206 for provision to ERP system 202. Report data 206 can include result data relating to implementation of the ERP request 204, presented at a desired level of granularity. For example, ERP system 202 may only require an indication that a production request specified by ERP request 204 was fulfilled, but does not require details regarding the particular equipment used or number of production cycles run in connection with completing the request. Accordingly, MES system 208 can be configured to omit such production details from report data 206.

It is to be appreciated that any suitable communication protocol can be used to affect the data exchanges described above. For example, ERP requests can be received by the MES system 208 in Business to Manufacturing Markup Language (b2mML), which is an XML implementation of the ANSI/ISA 95 family of standards. However, other suitable communication formats and protocols are also contemplated and are within the scope of the present disclosure.

The foregoing is intended to provide a general overview of the relationships and types of data exchange between the ERP system, MES system, and control system according to one or more embodiments of the present disclosure. As noted above, MES system 208 can receive an ERP request and map this request to a workflow deemed suitable for fulfilling the request. In one or more embodiments, this is achieved in part through the use of activity sets configured and stored on the MES system. An activity set defines a series of activities or a workflow for achieving a particular business goal. The activity set can define the activities in terms of the control or business functions to be performed, the order of operation for the steps, the designated machines or devices required to perform each step, or any other information required to fully define the control activity represented by the activity set. The scope of a given activity set can be limited to a single device, or can encompass multiple machines coordinated by the MES system to perform a distributed control operation in response to a received business request.

The workflow defined by an activity set can encompass both control-level activities and higher business-level activities acting in conjunction, thereby coordinating all levels of the enterprise to the end of satisfying the defined business goal. To this end, in addition to control operations, the activity sets can define interactions to be performed between the MES system and the ERP system relative to the defined sequence of control instructions. For example, it may be desired to provide validation feedback to the ERP system when a particular step of the control sequence associated with the activity set has been completed, or to provide an error message to the ERP system if a particular step of the control sequence fails or times out. Such feedback steps can be encoded in the activity set together with the control sequence activities. As will be discussed in more detail below, the MES system of the present disclosure can include a library of generalized industry-specific activity sets, which can be bound to a user's particular control context via controller tag mapping during initial configuration. The MES system also provides mechanisms allowing new custom activity sets to be created using an intuitive graphical interface that allows activity sets to be built from a library of control-level and business-level functional elements.

Figure 3:
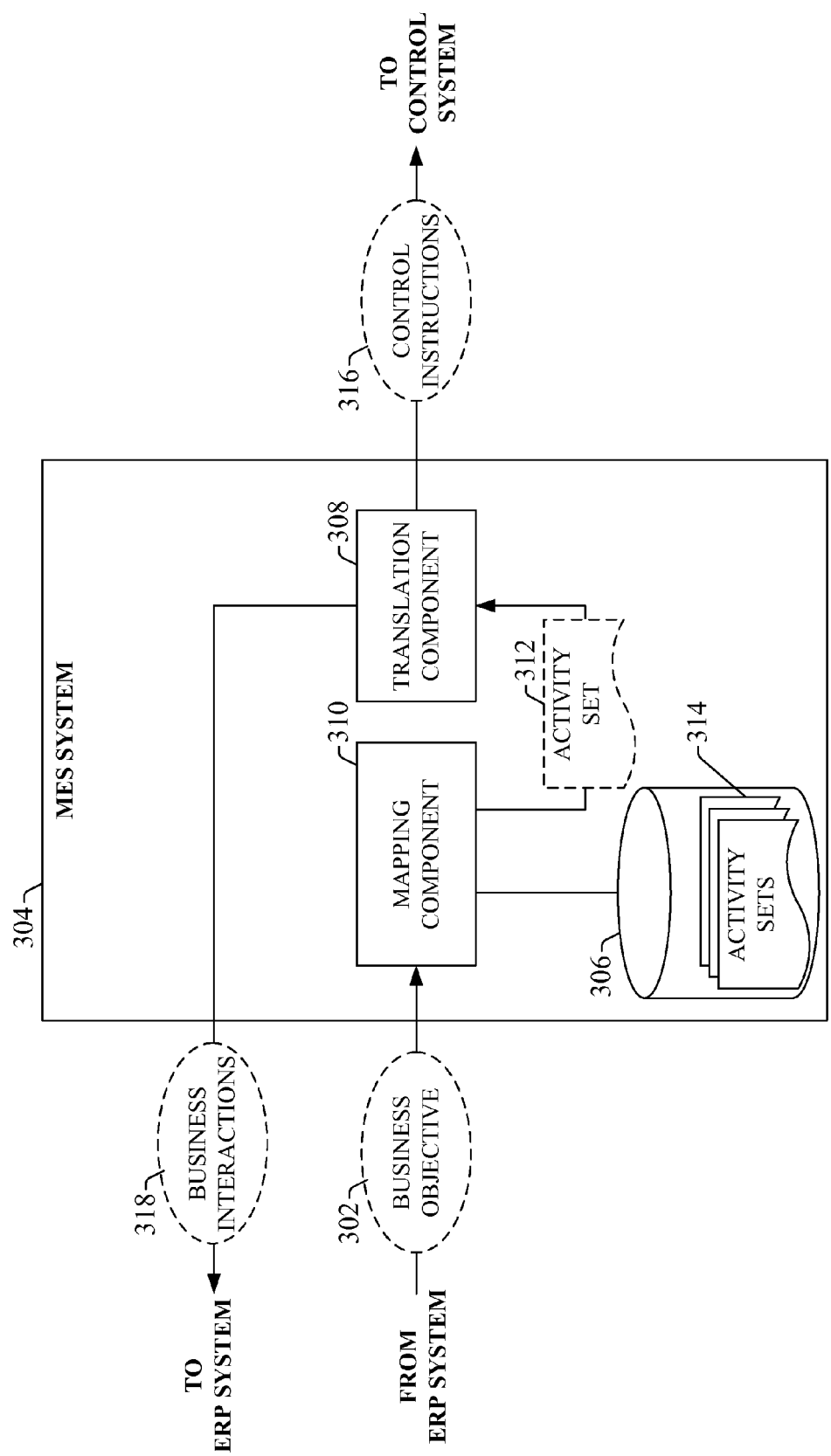
FIG. 3 is a block diagram of an MES system that maps a received ERP message to an activity set.

FIG. 3 illustrates mapping of a received ERP message to an appropriate activity set. Business objective 302 can be received at the MES system 304. This business objective can be received, for example, from an ERP system such as ERP system 202 in FIG. 2. Business objective 302 can be encoded as a b2mML message generated by the ERP system, although other data formats are within the scope of the present disclosure. The business objective 302 can represent, for example, a request from the ERP system for a specified amount of an indicated product to be produced, a customer order to be filled, a business-driven constraint on plant operation (e.g., a request to minimize overall plant energy usage at specified peak hours of the week while maximizing output of a preferred product), or other such business-level objectives requiring altered operation at the control level.

The business objective is passed to a mapping component 310 of the MES system. Based on criteria to be described in more detail infra, the mapping component analyzes the business objective to determine a suitable activity set for achieving the specified business objective 302. Mapping component 310 then accesses a library of activity sets 314 stored in an activity set database 306, and identifies a suitable activity set 312 from activity sets 314. The selected activity set 312 is passed to a translation component 308 for translation into a set of control instructions 316 for deployment to appropriate controllers or devices of the control system. Translation component 308 can translate the selected activity set 312 to a set of executable control instructions 316 compatible with the target controller(s) (e.g., sequential function chart, ladder logic, structured text, function block code, etc.), which can then be deployed to the appropriate controllers or devices. Additionally or alternatively, control instructions 316 can comprise analog, digital, or networked control outputs directed to the appropriate controllers to facilitate initiation of control sequences already stored on the controllers.

In addition to the control activities, the activity set can also include sequence steps defining interactions between the MES system 304 and the ERP system relative to the control sequence. Such steps can include business-level reporting, verification requests directed to business personnel, or access to a business-level database or other system. For example, the activity set can define an ERP reporting step to be triggered in response to completion, failure, or timeout of a particular control-level operation. In another example, performance of a control-side operation may be dependent upon a business variable stored in a database on the business level of the enterprise (e.g., a current energy cost, a current price of materials, a current customer demand, etc.). In such an instance, the activity set may define that the MES system should read this business variable prior to execution of the control-side operation, and make execution of the control-side operation contingent on this value. Accordingly, the translation component 308 can translate such business-related operations defined in the activity set into appropriate business interactions 318.

Figure 4:
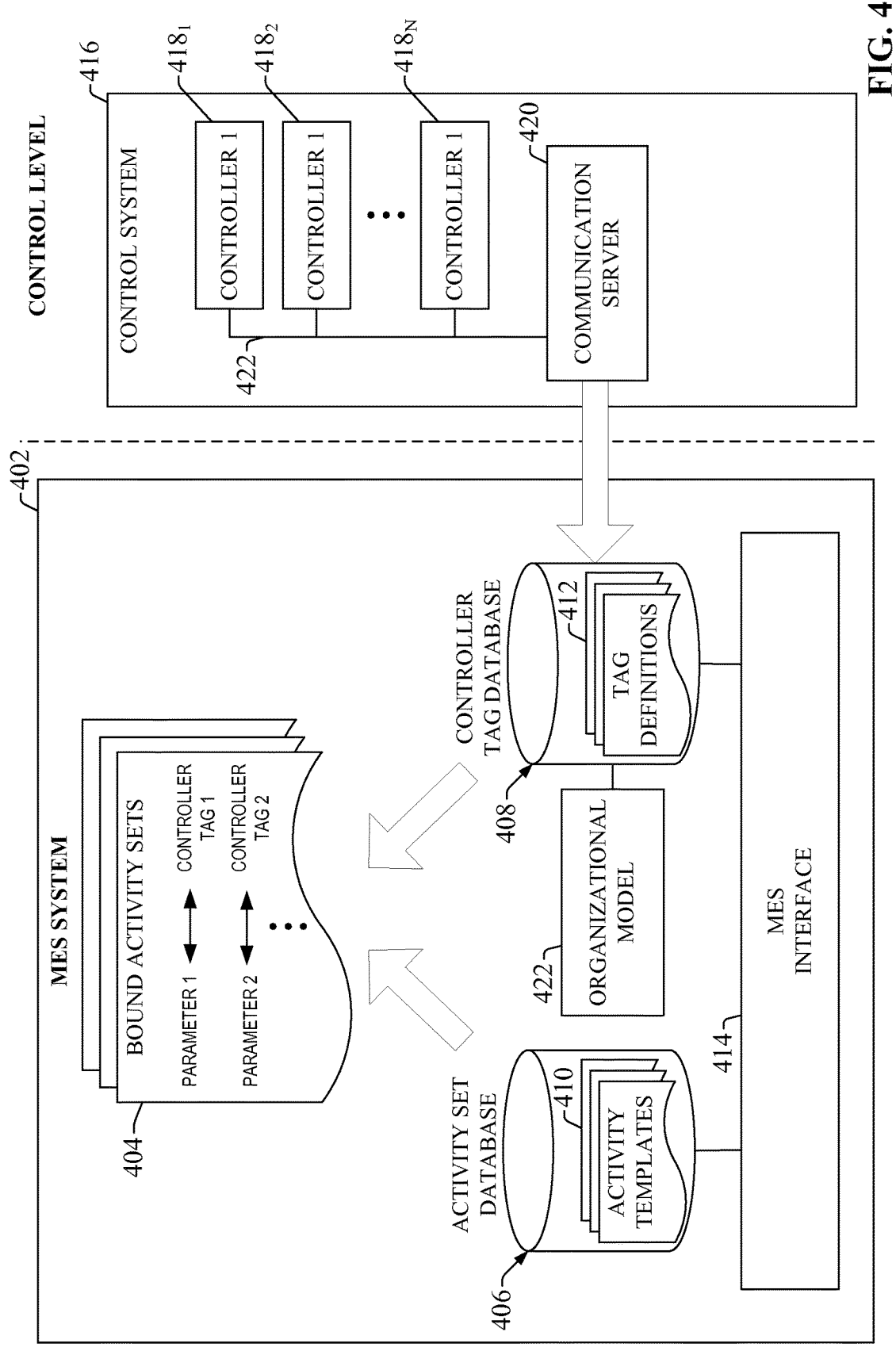
FIG. 4 illustrates binding of activity sets to an organization's control system.

Advantageously, the MES system of the present disclosure can provide generalized activity sets that can be adapted for use with an end user's control system prior to or during runtime. FIG. 4 illustrates binding of activity sets to an organization's control system. MES system 402 can include an activity set database 406 that stores a library of activity templates 410. Each activity templates 410 can include a set of control and/or business operations to be performed, parameters and any necessary conditionals associated with the respective operations, or any other information necessary to describe the operations represented by the activity template.

Before an activity set can be called by the MES system in response to an ERP request, the activity set must be bound to the control context of the user's control system 416. In one or more embodiments, this can be achieved by associating the parameters of the activity set with selected controller tags. Accordingly, MES system 402 can include a controller tag database 408 that maintains a set of tag definitions 412 corresponding to controller tags resident on control system 416 (e.g., the tags of controllers 418). In one or more embodiments, MES system 402 can access the available controller tags via a communication server 420, which can be an OPC (OLE for Processing Control) server used to facilitate data exchange between controllers 418 and other devices.

To facilitate tag location, the tag definitions 412 can be associated with an organizational model 422 defined on MES system 402. Organizational model 422 can be, for example, a hierarchical representation of the organization and associated plant contexts. Organizational model 422 can be based on the S88 or S95 model, although any suitable modeling standard is contemplated. The organizational model 422 can represent the organization in terms of hierarchical physical locations, organizational levels, plant areas, devices, or any other suitable contexts. The hierarchical levels defined in the model can include, but are not limited to, an enterprise level, site level, area level, line level, and/or workcell level. By modeling locations of the controller tags within the hierarchical organizational model, MES system 402 can locate controller tags using relative paths that define the tags in terms of their locations and context within the hierarchy.

MES system 402 includes an interface 414 that facilitates user interaction with activity set database 406 and controller tag database 408. Interface 414 can comprise any suitable graphical interface capable of receiving user commands as input and rendering output to the user. Through the MES interface 414, a user can select an activity template to be configured from activity set database 406, and associate parameters defined within the selected activity set with corresponding controller tags defined in the controller tag database 408. Binding the parameters of the activity template with selected controller tags yields a bound activity set 404, which can be stored and subsequently matched to an incoming ERP request by the MES system 402.

Figure 5:
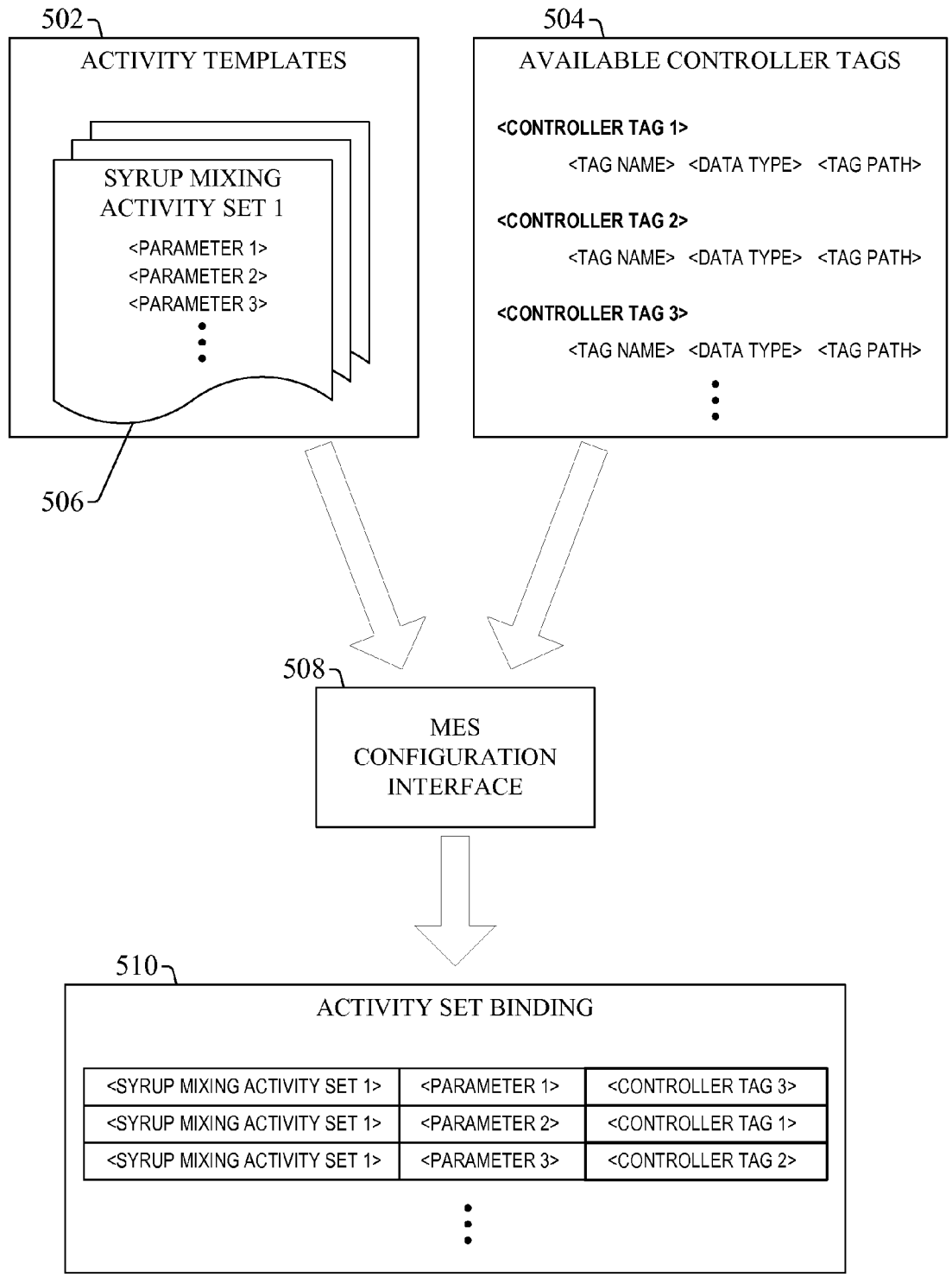
FIG. 5 illustrates an exemplary activity set binding.

FIG. 5 illustrates an exemplary activity set binding. In this example, a library of available activity templates 502 can include a generalized activity set 506 representing a syrup mixing sequence. The syrup mixing activity set 506 comprises a number of parameters, which serve as placeholders for controller tags required for execution of the activities defined in the generalized activity set. Parameters defined in the activity set can represent such controller elements as product quantities, mixer level valves, temperature values, start triggers, and the like.

Definitions for available controller tags 504 are stored on the MES system (for example, in the controller tag database 408 of FIG. 4). Available tags 504 can be defined in terms of tag name, data type, tag path, or other suitable information describing the tag. Available controller tags 504 can be rendered, via configuration interface 508, as a collective searchable list of available tags from any or all controllers comprising an enterprise. As noted above, the list of available controller tags 504 can be populated, for example, by accessing a communication server (such as server 420 of FIG. 4).

The MES system can allow a developer, through interface 508, to select the syrup mixing activity set 506, and to select tags from the available controller tags 504 for association with the parameters of the selected activity set 506. This results in the activity set binding 510, which can be viewed via the interface 508 as a series of rows, each representing a single parameter-tag binding. For example, a given row can include fields representing the selected activity set, a parameter defined by the activity set, and a controller tag selected for association with the parameter. As will be described in more detail below, the MES system can leverage these user-defined control bindings to translate activity sets to actionable outputs executable by the controllers.

Figure 6:
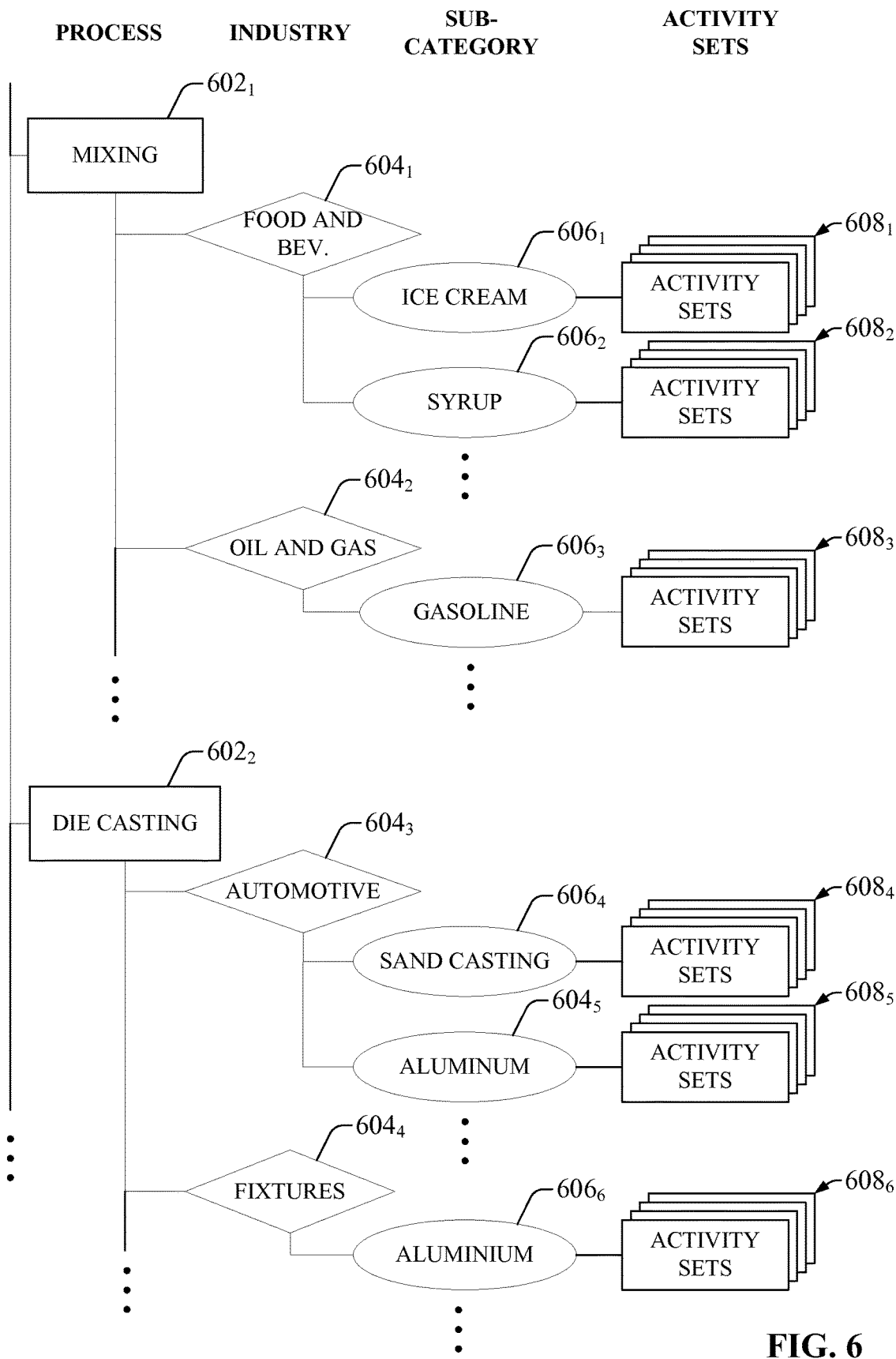
FIG. 6 illustrates an exemplary classification of activity sets according to categories and sub-categories.

To facilitate simplified location of a desired activity template, one or more embodiments of the MES system described herein can organize activity sets according to control function, industry, material, or any other suitable combination of browsable categories. FIG. 6 illustrates an exemplary organization of activity sets according to categories and sub-categories. In the exemplary architecture of FIG. 6, activity sets 608 are organized according to the process performed by the activity set, the industry in which the activity set is applicable, and any appropriate subcategories. For example, there may be multiple stored activity sets for performing a mixing process, as represented by activity sets $608_{1\text{-}3}$ under the MIXING category $602_1$. Since some industries may require their manufacturing processes to conform with defined standards particular to the respective industries, activity sets under the MIXING category $602_1$ may be further categorized according to industry (categories $604_{1\text{-}2}$). For example, the food and beverage industry may be bound by a different set of standards for mixing than the oil and gas industry. Accordingly, MIXING activity sets are further classified under FOOD AND BEVERAGE $601_1$ and OIL AND GAS $604_2$, which branch hierarchically from the MIXING category $602_1$.

Under each INDUSTRY category 604, MIXING activity sets $608_{1\text{-}3}$ can be further classified according to any desired set of sub-categories. In this example, MIXING activity sets for FOOD AND BEVERAGE can be further classified according to the material being mixed, such as ICE CREAM $606_1$ or SYRUP $606_2$. A similar classification structure for DIE CASTING activity sets $608_{4\text{-}6}$ is also depicted in FIG. 6. In this way, activity sets 608 stored in the MES system can not only define industrial control functions, but can also encode within the functions any necessary standards associated with the particular industry, as well as control variations tailored to a given material or other process sub-category. Such activity set classifications can allow workflows to be defined within the MES system without the need for low-level programming. Given the classification structure depicted in FIG. 6, one or more embodiments of the MES system described herein can allow a developer to quickly locate a suitable activity set during configuration and to customize the selected activity set for use with the user's particular control context through tag binding.

Figure 7:
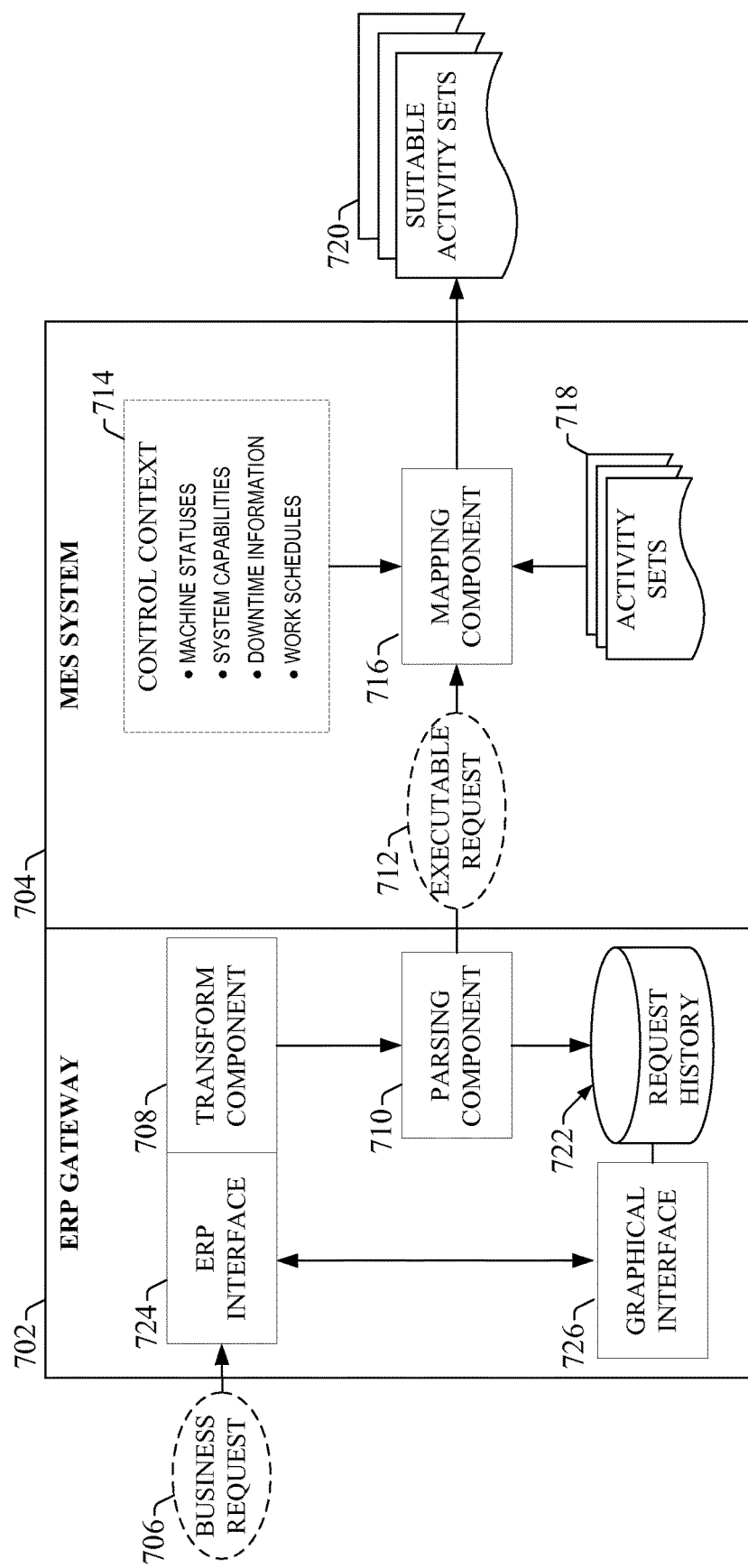
FIG. 7 is a block diagram illustrating processing of a business-related request by an MES system to yield a set of potential activity sets.

FIG. 7 illustrates how a business-related request is processed by the MES system to yield a set of potential activity sets according to one or more embodiments. Business request 706 is received at the MES system 704. The business request 706 can be received, for example, from an ERP system or other high-level business management system as a b2mML message. Business request 706 can represent, for example, a production request from the business level of the enterprise, a customer order to be fulfilled, a schedule of plant operations, a set of business constraints that require modification of plant operation, or other such requests originating at the business level and affecting the control level of the enterprise.

According to one or more embodiments, the business request can be received by an ERP gateway 702 associated with MES system 704. The ERP gateway 702 can provide a flexible mechanism for interfacing MES system 704 with substantially any type of business system for exchange of business and production information. The ERP gateway 702 can manage format transformation and parsing of the business request 706 into one or more executable elements that can be mapped by the MES system 704 to one or more suitable activity sets.

To facilitate flexible configuration of the MES system for operation with a range of ERP or other business systems, ERP gateway 702 can include a ERP interface 724, which can be configured prior to deployment for compatibility with a specific business system in use. An associated graphical interface 726 can guide a developer through this configuration process. In one or more embodiments, ERP gateway 702 can be pre-bundled with selectable configurations corresponding to common existing ERP or other business systems. Graphical interface 726 can also allow selection of an expected data format (e.g., b2mML) in which data is to be exchanged between the MES system and the ERP system. During runtime, business request 706 can be received by the configured ERP interface 724, and transformed by an associated transform component 708 from a data format used by the ERP system (e.g., B2mML) to a format understandable by MES system 704. In one or more embodiments, the transform component 708 can convert the business request 706 for communication to the MES system using Java Message Service (JMS), although any suitable messaging format is within the scope of the present disclosure.

The transformed business request can then be analyzed by parsing component 710 in order to identify elements within the request that can be matched to one or more activity sets. For example, if the business request 706 is a customer order for a defined quantity of a specified product, parsing component 710 can identify the specified product, the quantity, and any timeframe information included in the request (e.g., a deadline to fulfill the order). In another example, if the business request 706 is a mandate that production of a specified product is to be given production priority given a defined energy constraint during peak energy hours, parsing component 710 can break down the request to identify the preferred product to be optimized, the energy constraint (e.g., the maximum desired energy consumption for the plant as a whole), and the hours for which the energy constraint is to be in effect. These identified elements of the transformed business request can then be passed to the MES system 704 as an executable request 712 for association with one or more activity sets. Optionally, the ERP gateway can additionally store details of the received business request 706 in a request history database 722 for future reference. This request history can be accessed by the graphical interface 726 to facilitate review of previously received ERP requests.

Executable request 712 is passed to a mapping component 716 of the MES system, which analyzes the request in view of the current control context 714 of the plant in order to match a subset of activity sets 718 with the request 712. Activity sets 718 can comprise customized activity sets that have been bound to selected controller tags of the control system, as described above in connection with FIGS. 4 and 5. Based on the elements in executable request 712 and the control context 714, mapping component 716 can select a suitable subset of activity sets 720 capable of satisfying the business request 706. Control context 714 can include such pre-configured or substantially real-time information as machine statuses and availability, the architecture and capabilities of the control system, current machine or system downtime information, work schedules, or other information relevant to execution of the business request. Control context information 714 can be provided manually by a user or generated automatically based on real-time monitoring of the control system by the MES system 704.

As an example of how control context 714 can be used to facilitate selection of an activity set, consider a business request representing a customer order for a specified quantity of a selected product. In this example, the order is received from an ERP system as business request 706. Since ERP system has no knowledge of the particular control context on the plant floor for fulfilling this request, the request includes no indication of which particular machines or process lines are to be used to satisfy the order. Upon receiving executable request 712 corresponding to business request 706, mapping component 716 can leverage the control context information 714 to identify machines capable of fulfilling the request, the process that must be executed on these machines to produce the desired quantity of the product, and the current status and availability of the respective machines. Based on this information, mapping component 716 can select one or more suitable activity sets 720 corresponding to the identified process for execution on the identified machines. In some cases, the activity sets 718 may include different activity sets corresponding to the same process, but intended for execution on different machines (e.g., two different mixers having different control characteristics). If the different machines are capable of producing the ordered product, mapping component 716 can leverage control context 714 to determine a preferred machine on which to execute the order based on efficiency, respective machine availabilities, maintenance cycles, load balancing, or other such considerations made available by control context 714. In another example, the same activity set may be executable on different machines. Therefore, rather than selecting an activity set corresponding to a preferred machine, MES system 704 can select the activity set common to the different machines and select a target machine for the activity set based on the control context 714. Moreover, since a product quantity is associated with the customer order, this product quantity information can be passed from the executable request to the selected activity set as a variable, since the selected activity set may be generalized in terms of product quantity.

Figure 8:
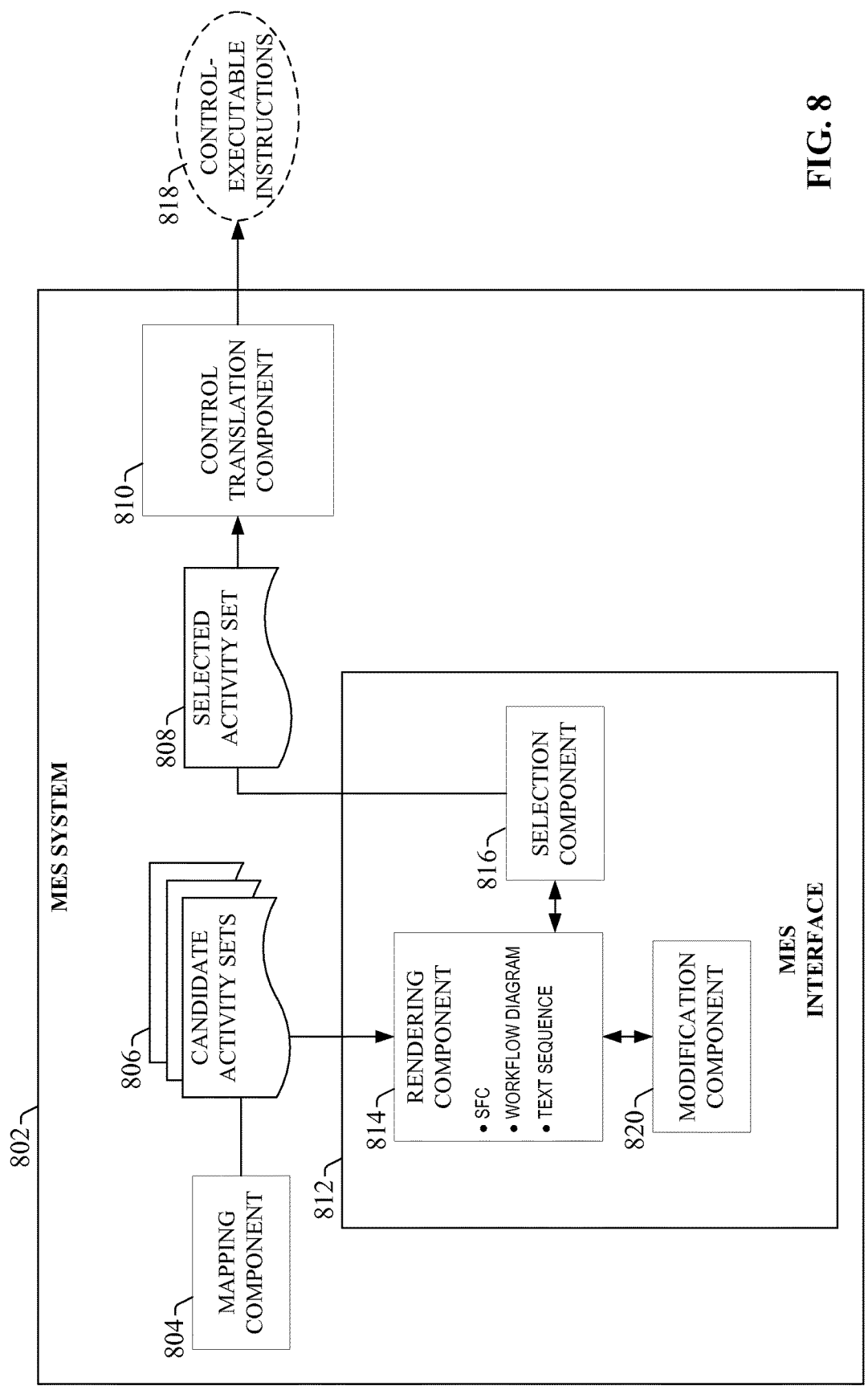
FIG. 8 is a block diagram illustrating processing of candidate activity sets selected in response to a business request.

FIG. 8 illustrates subsequent processing of the activity sets selected by the mapping component in response to a business request. In an exemplary scenario, if mapping component 804 determines that multiple candidate activity sets are capable of satisfying the business request given the current control context, the candidate activity sets 806 may be presented via interface 812 for review and selection by a user via selection component 816. Advantageously, a rendering component 814 of the interface 812 can render the activity sets as graphical workflows to facilitate simplified understanding by non-programmers. In one or more embodiments, the activity sets can be rendered as sequential function charts (SFCs) or workflow diagrams. However, other suitable presentation options are also considered. For example, one or more embodiments of the rendering component 814 can provide an option to display the activity sets as a sequence of text instructions.

In one or more embodiments, interface 812 can also afford the user the opportunity to modify a rendered activity set prior to deployment via modification component 820. For example, the user may decide that a particular step of the activity set should be omitted, or an order of steps changed, given current plant conditions known to the user. Such modification can be made via interface 812 using modification component 820. For example, if the activity set is rendered as an SFC, interface 812 can allow the user to modify the SFC using drag-and-drop interactions with the graphical functional steps comprising the SFC-based activity set. Such graphical interactions can mitigate the need for low-level programming expertise when modifying the activity sets. After all desired modifications are made to the selected activity set, the modification component 820 can afford the user the option of saving the changes back to the activity set database (e.g., activity set database 306 of FIG. 3) to render the changes permanent, or alternatively to apply the changes only to the present deployment of the activity set.

Upon selection of a preferred activity set from the candidate activity sets 806 (and after any desired modifications), the selected activity set 808 can be translated by control translation component 810 to a set of instructions 818 or signals executable by the target controllers or devices of the control system. That is, the steps of the selected activity set 808 can deployed as executable instructions 818 to the controllers or devices required to perform the steps of the activity set. Alternatively, MES system 802 can render the activity set as human-readable instructions for carrying out the activity set and thereby satisfying the original business request.

Figure 9:
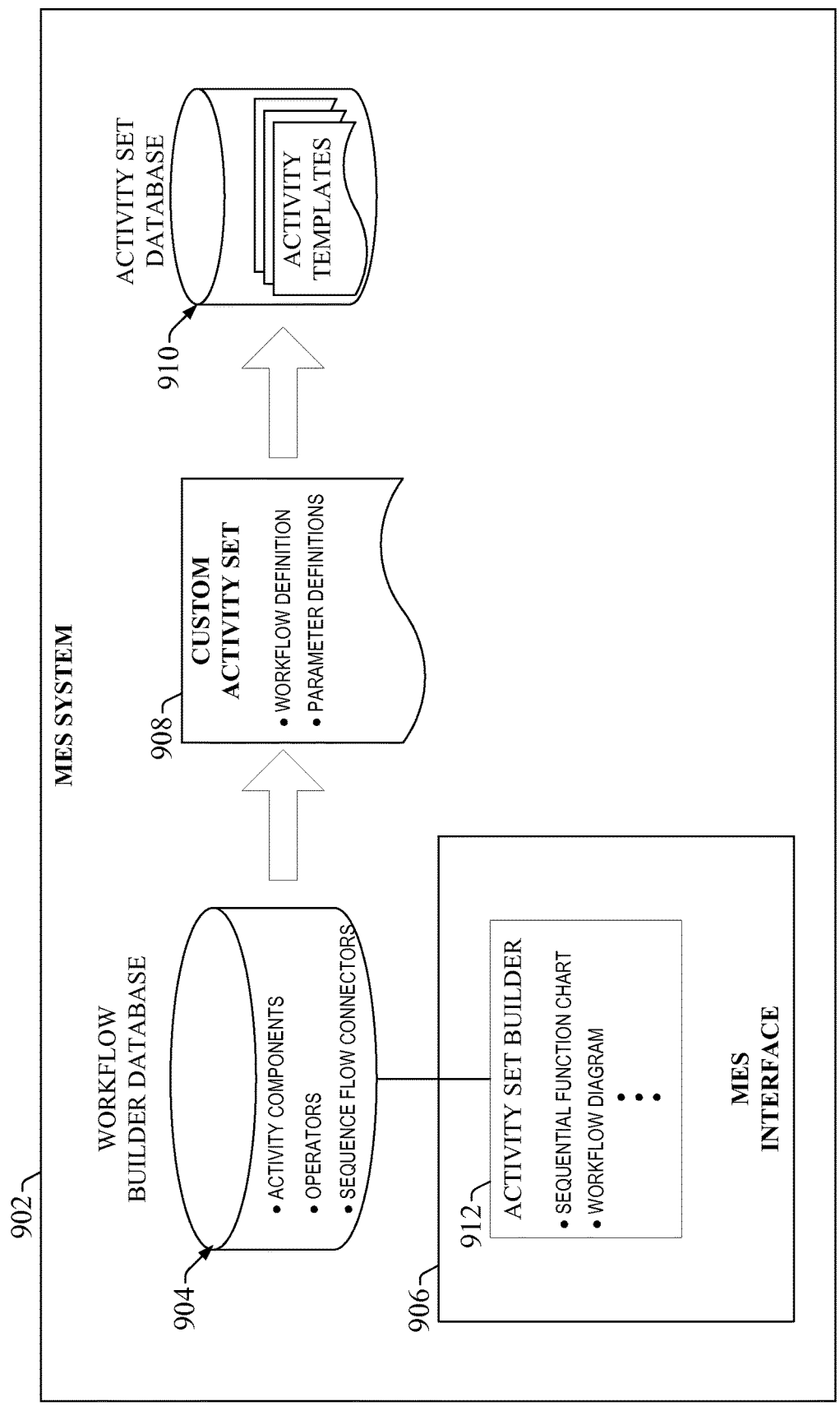
FIG. 9 illustrates creation of a custom activity set.

Although the foregoing examples have presumed predefined classes of industry-specific activity sets which can be selectively bound to the controller tags of the user's control system, one or more embodiments of the MES system described herein can also include the capability to build custom activity sets for storage in the activity set database. FIG. 9 illustrates creation of such custom activity sets. MES system 902 can include an activity set builder 912, accessible via the MES interface 906. Activity set builder 912 can provide access to a workflow builder database 904, which includes preconfigured base components that can be used to construct an activity set. These base components can include both control-related blocks and business-related blocks, so that activity sets can be built relating process control steps with business-side reporting, approval, record-keeping, and/or data retrieval steps according to developer preferences. Base components stored in the activity builder database can include functional components (e.g., function blocks) representing units of control- or business-related functionality, such as reporting, data retrieval, error handling, approvals, sign-offs, or other such functionality. The base components can also include operators and/or sequence flow connectors for linking the functional components in a desired operational sequence and relationship. Activity set builder 912 can allow activity sets to be constructed from the base components in a graphical drag-and-drop manner, thereby facilitating intuitive configuration of MES interactions with the business-level ERP system and the control-level systems without the need for low-level programming to be written. Any necessary parameters for subsequent binding to controller tags can also be defined and associated with selected workflow steps of the activity set. The resulting custom activity set 908 can then be saved to the activity set database 910 for subsequent user selection and controller tag binding (as described above in connection with FIGS. 4 and 5). After a custom activity set 908 has been created by a developer, MES interface 906 can allow the developer to classify the new activity set at a selected location within the activity set classification hierarchy (e.g., the hierarchy exemplified in FIG. 6), or to create a new classification within the storage hierarchy for storage of the new activity set.

Figure 10:
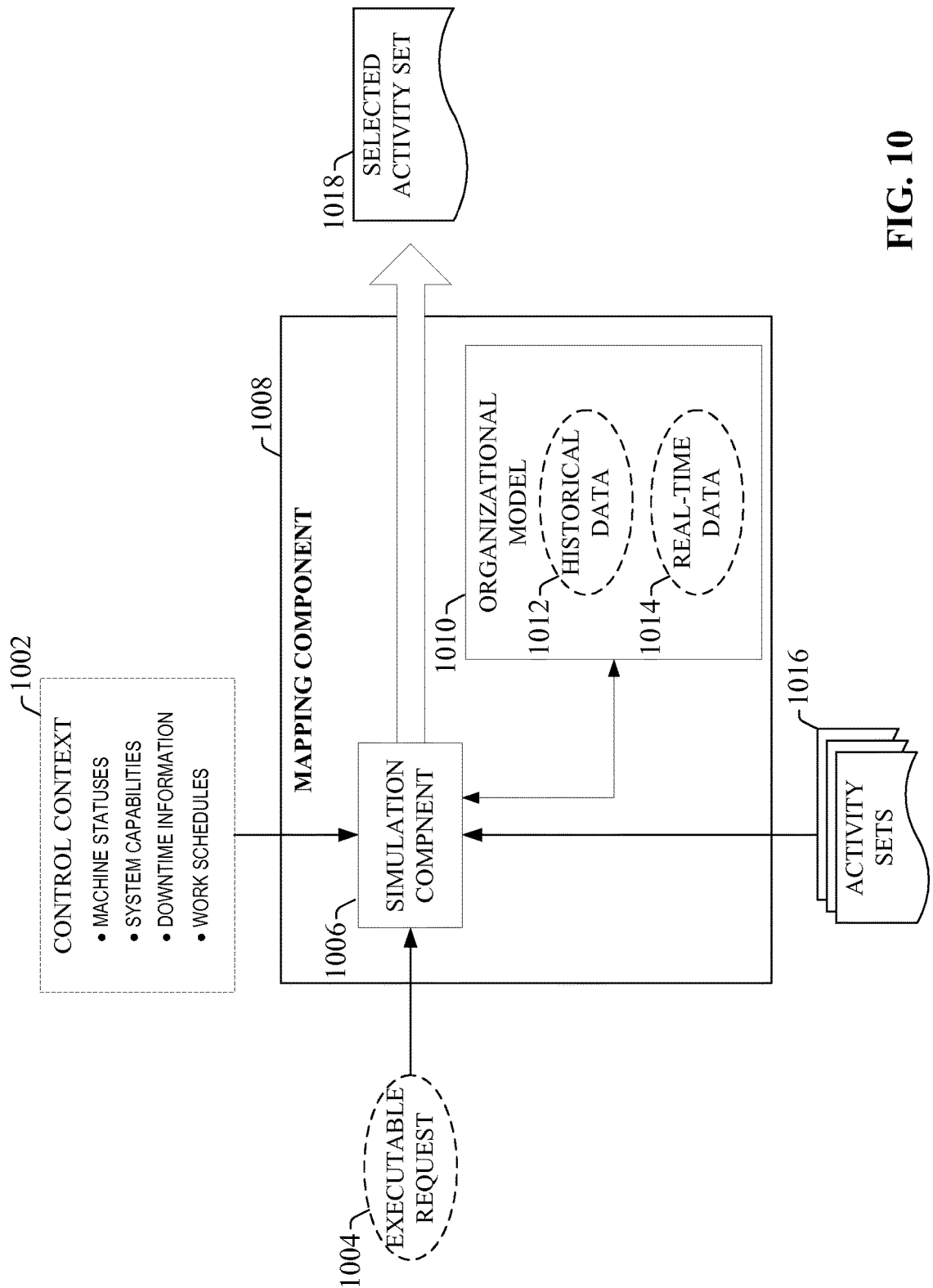
FIG. 10 illustrates the use of plant simulation to facilitate selection of an activity set.

FIG. 10 illustrates a mapping component that leverages plant simulation to facilitate selection of an activity set according to one or more embodiments. Mapping component is similar to mapping component 716 of FIG. 7. As in previous examples, mapping component 1008 receives an executable request 1004 based on a business request received from a business-level system, such as an ERP system. Executable request can be provided, for example, by ERP gateway 702 of FIG. 7. In this example, mapping component 1008 includes a simulation component 1006, which can leverage simulated plant scenarios to facilitate selection of a most suitable activity set for satisfying the executable request 1004.

When the executable request 1004 is received, simulation component can execute an iterative simulation based on an organizational model 1010 of the enterprise and current control context 1002. Organizational model 1010 can comprise a simulation model of the enterprise that leverages both historical data 1012 and real-time data 1014 to maintain an up-to-date representation of the enterprise. Control context 1002 can comprise information similar to control context 714 of FIG. 7, including machine statuses, system capabilities, downtime information, work schedule, etc. Based on one or both of the current control context 1002 and the organizational model 1010, simulation component 1006 can simulate execution of the executable request 1004 under a plurality of possible scenarios. For example, multiple simulations can be run corresponding to execution of the request on different machines, production lines, or facilities to determine optimal equipment or locations for fulfilling the request. Scenarios can also be run for different materials, work shifts, or other variables. Results of the simulations can be compared in terms of one or more specified selection criteria, including most cost efficient, most energy efficient, fastest turn-around, or any other suitable criterion. These selection criteria can be specified within the original business request, or can be preconfigured as part of the MES system configuration. Based on the results generated by the simulation component 1006, mapping component can select an activity set 1018 that most closely matches the optimal simulation scenario identified by the simulation component. The selected activity set 1018 can then be processed as described above in connection with FIG. 8.

According to one or more embodiments, simulation component 1006 can also run simulations on the activity sets 1016 themselves in view of the current control context 1002. In such embodiments, simulation component 1006 can simulate multiple activity sets 1016, adjusting the parameters and constraints of the simulations in accordance with current control conditions indicated by the control context 1002. Mapping Component 1008 can then select the activity set for which a most favorable simulation result was obtained given a specified selection criterion.

Figure 11:
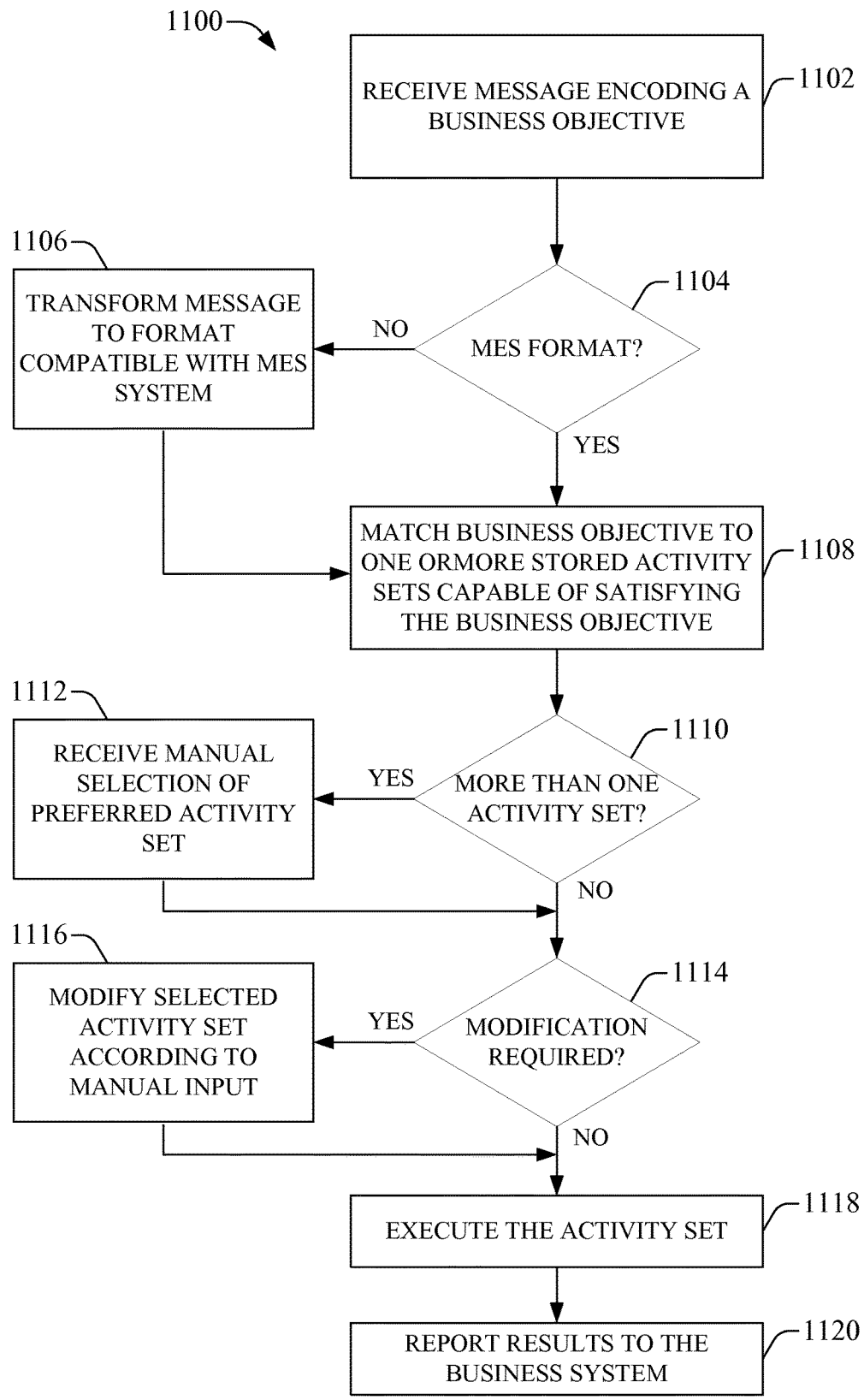
FIG. 11 is a flowchart of an example methodology for matching a business objective with a stored activity set in an MES system.
Figure 12:
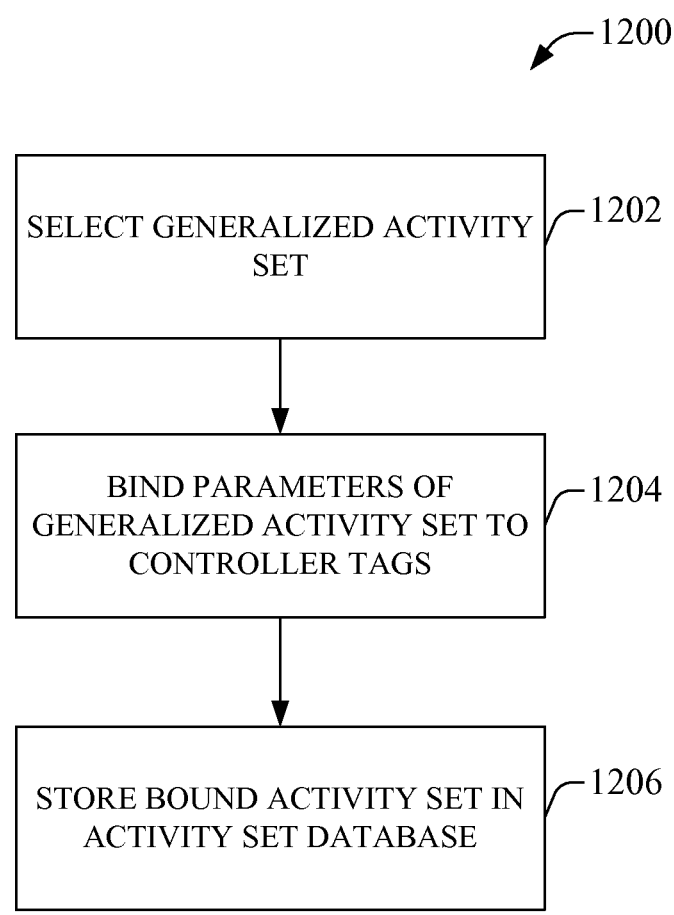
FIG. 12 is a flowchart of an example methodology for binding a generalized activity set with selected controller tags.
Figure 13:
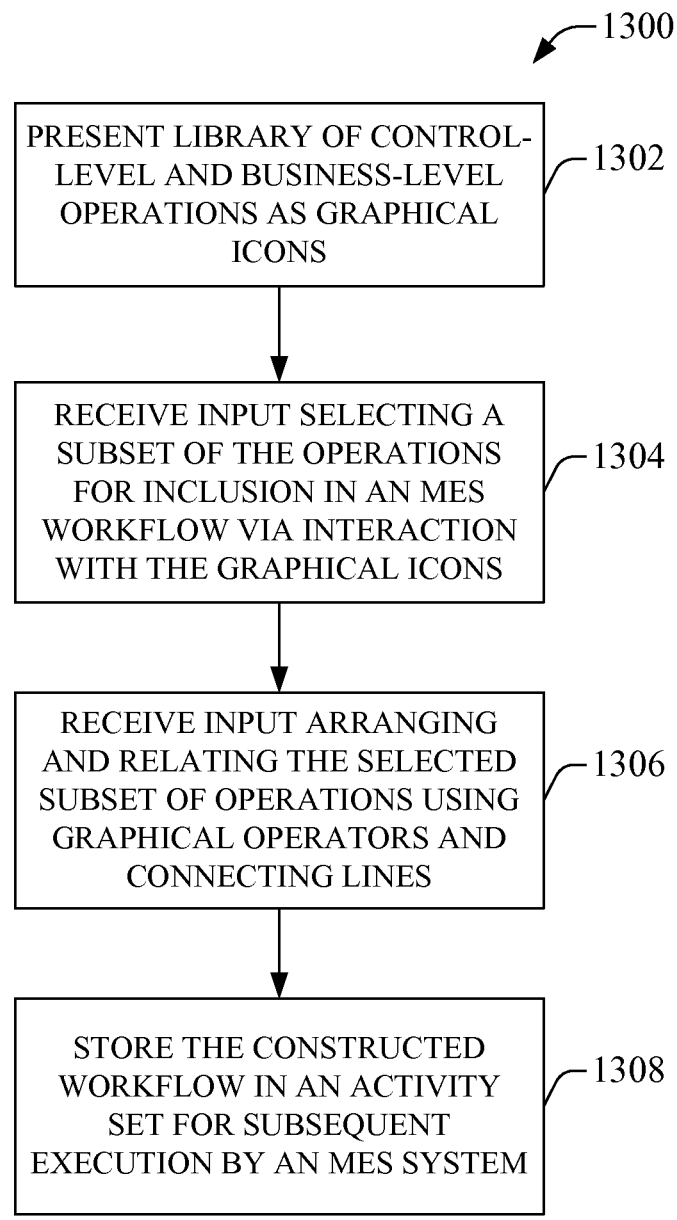
FIG. 13 is a flowchart of an example methodology for creating an MES workflow using a graphical interface.

FIGS. 11-13 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11 illustrates an example methodology 1100 for matching a business objective with a stored activity set in an MES system. At 1102, a message having a business objective encoded therein is received. In one or more embodiments, the message can be received from an ERP system as a b2mML data structure, although other types of business systems and message formats are contemplated. The business objective can represent a goal or instruction generated by the ERP system and driven by business-level considerations. Exemplary business objectives can include fulfillment of a customer order, performance of a product quality check, a request to maintain overall energy consumption for the plant below a specified maximum during indicated hours of the week, a request to give priority to production of a specified product when allocating materials or resources, or other such business-driven objectives. If the message is to be processed by an MES system, the message can be received directly by the MES system, or by an ERP gateway that manages message exchanges between the business-level system and the MES system.

At 1104, it is determined whether the message is in a format compatible with an MES system in receipt of the message. If not, the message is transformed to a format compatible with the MES system at 1106. For example, the MES system can convert the message from b2mML format to a format compatible with JMS (Java Message Service) for transfer of the message to the MES system. In one or more embodiments, this transformation can be performed by the ERP gateway prior to delivery to the MES system. Alternatively, the MES system itself can transform the message.

After transformation of the message (or if no transformation is necessary), the method proceeds to step 1108 where the MES system identifies a stored activity set capable of satisfying the business objective encoded in the message, and associates the message with the identified activity set. The activity set can define a workflow comprising one or both of control-level operations and business-level operations to be performed in a defined sequence under the coordination of the MES system. Upon receipt of the message from the ERP system, the MES system can access a library of such activity sets and select an activity set capable of satisfying the business objective.

At 1110, it is determined whether more than one activity set has been identified as being suitable for carrying out the business objective. If more than one activity set has been identified, a preferred activity set is selected from the candidate sets at 1112. In one or more embodiments, the preferred activity set can be selected manually. In such cases, the candidate activity sets can be rendered visually to a user for selection. The MES system can visualize the candidate activity sets as graphical workflows to convey the sets in an intuitive manner.

Once the candidate activity sets have been narrowed to a single suitable activity set, a determination is made at 1114 as to whether modifications to the activity set are required. For example, a user may determine that the stored version of the workflow does not take into account a current atypical control-side condition (e.g., an unplanned change in work schedules, a machine outage or defective control component, an unexpected resource shortage, etc.). If a modification is required, the MES system can allow the user to modify the activity set via manual input at 1116. Since the activity set can be displayed as a graphical workflow, changes can be made to the activity set without extensive programming expertise. For example, if the activity set is rendered as a sequential function chart (SFC), the associated workflow can be modified using drag-and-drop interaction with the function blocks comprising the SFC.

At 1118, the selected activity set is executed by the MES system. This can comprise converting the control-side workflow operations defined in the activity set into control instructions executable by the controllers or devices involved in the workflow. These instructions can then be deployed to the controllers by the MES system. Similarly, any business-level interactions defined in the activity set can be achieved through suitable data exchanges between the MES system and relevant business-level systems (including the ERP system). At 1120, results of the activity set execution are reported to the ERP system. The MES system can be configured to report these results at any desired level of granularity. For instance, business personnel may only be interested only in a general confirmation that the business objective was satisfied. Consequently, the MES system can provide this confirmation while omitting details regarding the control sequence used to achieve the result (e.g., which machines were employed, how many batches were run to fulfill a customer order, etc.).

FIG. 12 illustrates an example methodology 1200 for binding a generalized activity set a set of controller tags. At 1202, a generalized activity set is selected. The generalized activity set can be selected from a library of such activity sets associated with an MES system, and can represent a workflow incorporating one or both of control-side and business-side operations for achieving an overall business objective. To facilitate simplified selection of the generalized activity set, the library of generalized activity sets can conform to an industry-specific class system that classifies the activity sets according to industry, control process, material, or any other suitable categorization.

At 1204, parameters defined in the general activity set are bound to selected controller tags of a user's control system. In one or more embodiments, the MES system can determine available controller tags by accessing a communication server (e.g., an OPC server) communicatively connected to the various controllers comprising the control system. Alternatively, the MES system can poll the controllers directly for available tag information. The MES system can present the available controller tags together with relevant information about the tags, such as tag names, data types, tag path information, user comments associated with the tags, or other such information. In one or more embodiments, tag path information for the available tags can be presented in the context of a hierarchical model of the enterprise, which models the enterprise in terms of hierarchical physical locations or organizational levels encompassing all or part of the enterprise (e.g., an enterprise level, site level, area level, line level, and/or workcell level).

After the activity set parameters have been bound to selected controller tags, the bound activity set can be stored in an activity set database at 1206 for subsequent selection and execution by the MES system in response to a business request. When a business request is received at the MES system (e.g., from an ERP system or other business-level system), the MES can match the business request with the bound activity set and execute the activity set in order to satisfy the business request, where the controller tag binding determines how execution of the activity set is translated into plant floor interactions (e.g., which machines are used to satisfy the request, what processes are run on the selected machines, etc.).

FIG. 13 illustrates an example methodology 1300 for creating an MES workflow using a graphical interface. At 1302, a library of control-level and business-level operations executable by an MES system are presented as graphical icons via an MES interface. Control-level operations can include, for example, initiation of batch sequences, motor control instructions, triggering of industrial robot routines, or any other suitable control level operations. Business-level operations can include, for example, read operations directed at a business-side database, generation of report feedback to a business-side server, solicitation of a manual confirmation or approval from a business-level employee, or other such business-side interactions.

At 1304, the MES interface can receive input selecting a subset of the operations for inclusion in a workflow via interaction with the graphical icons. In one or more embodiments, this interaction can comprise drag-and-drop interaction with the graphical icons. At 1306, the selected workflow operations can be arranged and related using graphical operators and/or graphical connecting lines. In this way, a workflow can be constructed intuitively without requiring low-level programming expertise, thereby mitigating the need for an experienced programmer to develop MES operations for handling business requests. The graphical MES interface can thereby place greater control of MES configuration in the hands of business-level and plant-level personnel who typically have greater understanding of the business and control operations than IT personnel. After the workflow has been built, it can be saved as an activity set at 1308 for subsequent execution by the MES system. For example, in response to receipt of a business objective from an ERP system, the MES system can match the business objective with the stored activity set, and execute the activity set to facilitate achieving the objective.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
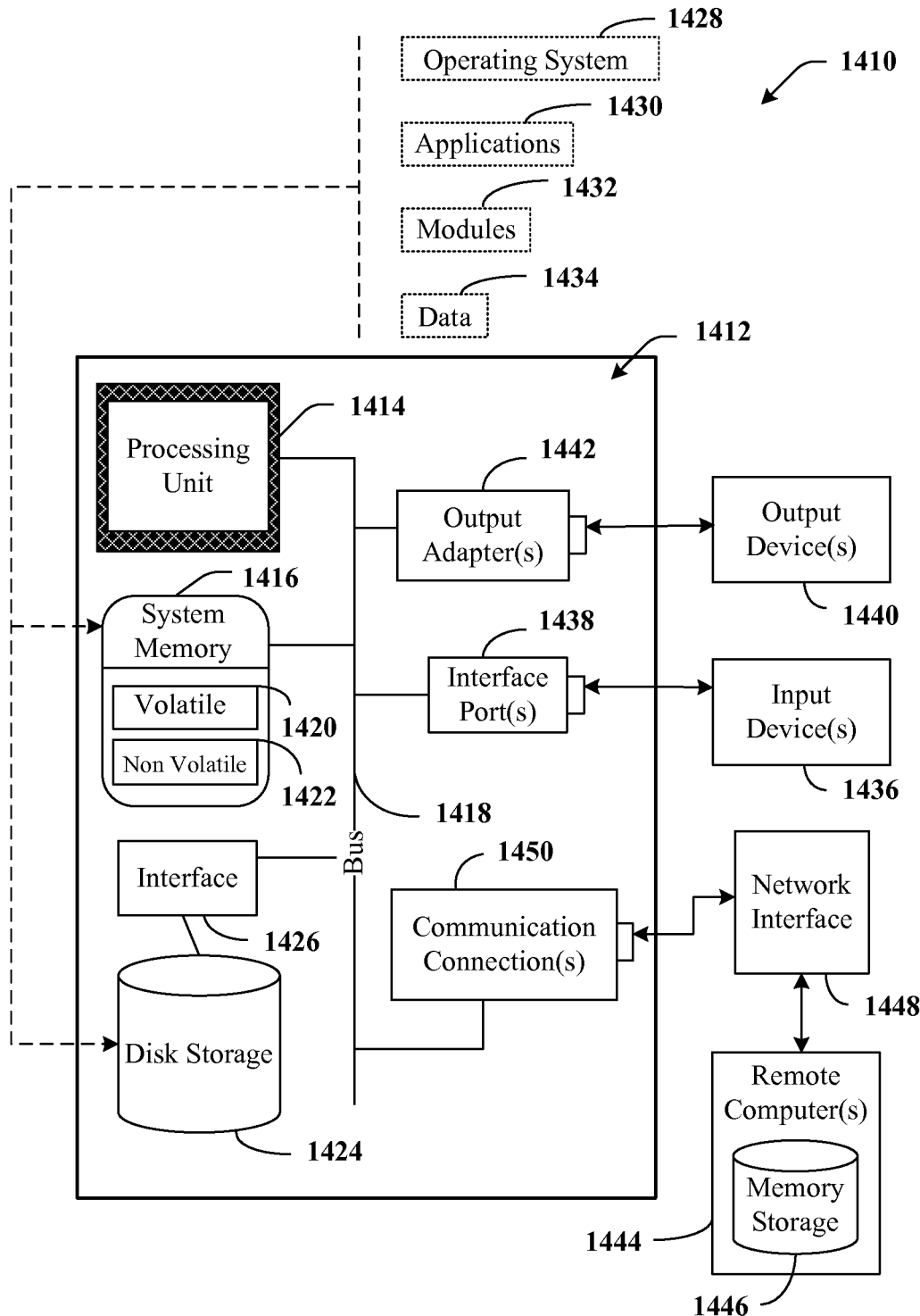
FIG. 14 is an example computing environment.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
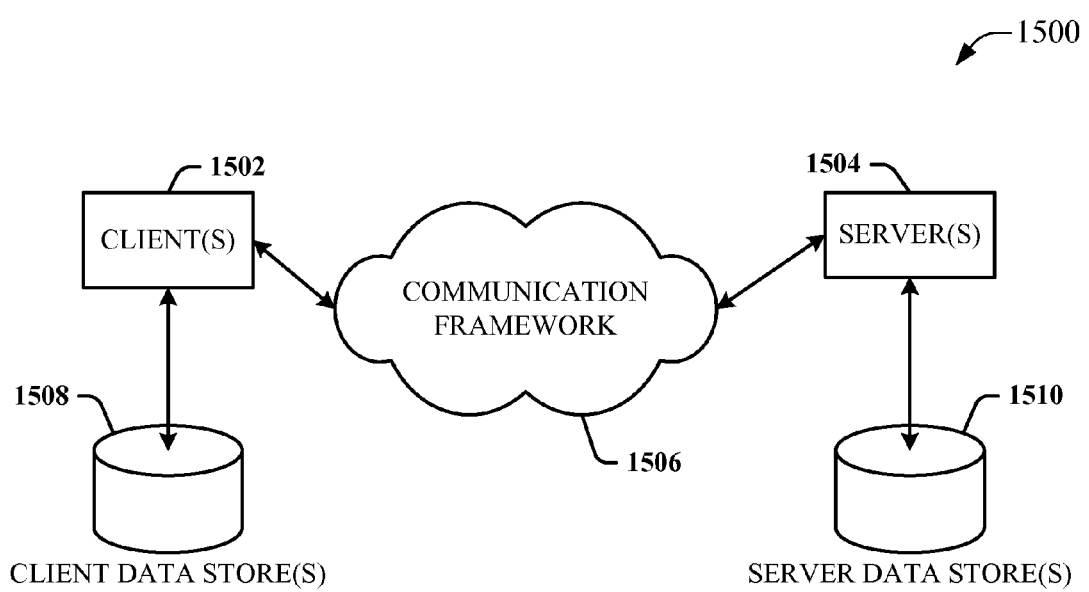
FIG. 15 is an example networking environment.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and a server 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system for executing a business objective, comprising:
   a memory that stores executable components;
   a processor, operatively coupled to the memory, that executes the executable components, the executable components comprising:
     a template database configured to store a plurality of activity templates representing generalized activity sets;
     a graphical interface configured to receive first input selecting a parameter of an activity template of the plurality of activity templates, and second input selecting a controller tag of an industrial controller to map to the parameter of the activity template to yield a bound activity set;
     an activity set database configured to store the bound activity set as one of a plurality of activity sets, the plurality of activity sets defining respective workflows capable of execution by one or more manufacturing and execution systems (MES);
     a context monitoring component configured to monitor availability statuses for a set of machines deployed within an industrial environment;
     a gateway component configured to receive a message defining a business objective;
     a simulation component configured to perform multiple simulations representing execution of the business objective under multiple different control scenarios to yield respective simulation results, wherein performance of the multiple simulations is based on an organizational model of the industrial environment, and wherein at least one constraint of the simulations is set based on the availability statuses;
     a mapping component configured to match the message to a selected activity set of the plurality of activity sets based at least in part on the business objective and a comparison of the respective simulation results; and
     an execution component configured to execute a workflow defined by the selected activity set.

2. The system of claim 1, wherein the gateway component is further configured to receive the message from an Enterprise Resource Planning (ERP) system.

3. The system of claim 2, further comprising a transform component configured to convert a data format of the message from a first format used by the ERP system to a second format compatible with the one or more MES systems.

4. The system of claim 1, wherein the execution component is further configured to translate the workflow defined by the selected activity set into at least one control instruction and to deploy the at least one control instruction to one or more industrial controllers associated with the subset of the machines.

5. The system of clam 1, wherein the execution component is further configured to translate the workflow defined by the selected activity set into at least one instruction for exchanging data with a business-level device.

6. The system of claim 1, wherein the template database is further configured to classify the plurality of activity templates according to at least one of an industry or an industrial process.

7. The system of claim 1, further comprising a graphical interface configured to render the selected activity set as a graphical workflow comprising multiple icons representing respective executable operations and at least one graphical connecting line joining at least two of the multiple icons.

8. A method for selecting and executing a Manufacturing and Execution System (MES) workflow in accordance with a defined business goal, comprising:
   storing, by a system comprising a processor, a plurality of activity templates representing generalized activity sets;
   receiving, by the system, first input selecting a parameter of an activity template of the plurality of activity templates, and second input selecting a controller tag of an industrial controller to map to the parameter of the activity template to yield a bound activity set;
   storing, by the system, the bound activity set as one of a plurality of activity sets, the plurality of activity sets defining respective workflows capable of execution by one or more manufacturing and execution systems (MES);
   monitoring, by the system, availability statuses of machines within an industrial environment;
   receiving, by the system, a message specifying a business objective;
   performing, by the system, multiple simulations representing execution of the business objective using multiple different control scenarios to yield respective simulation results, wherein performance of the multiple simulations is based on an organizational model of the industrial environment, and wherein at least one constraint of the multiple simulations is set in accordance with the availability statuses of the machines;
   matching, by the system, the message to a selected activity set, of the plurality of activity sets, based on the business objective and a comparison of the respective simulation results; and
   executing, by the system, an MES workflow defined by the selected activity set.

9. The method of claim 8, wherein the performing the multiple simulations comprises:
   monitoring, by the system, a control context of an automation system; and
   setting, by the system, at least one other constraint of the multiple simulations based at least in part on the control context.

10. The method of claim 8, further comprising rendering, by the system, the selected activity set as a graphical workflow comprising a set of icons representing executable steps of the selected activity set and at least one connecting line relating at least two icons of the set of icons.

11. The method of claim 10, further comprising transforming, by the system, the message from a first format to a second format compatible with an MES system.

12. The method of claim 8, further comprising:
translating, by the system, the MES workflow defined by the selected activity set into at least one control instruction executable by one or more industrial controllers that control the machines; and
providing, by the system, the at least one control instruction to the one or more industrial controllers.

13. The method of claim 12, wherein the translating comprises translating the MES workflow based at least in part on a binding defined by the first input and the second input.

14. The method of claim 8, further comprising organizing, by the system, the plurality of activity sets according to a hierarchical classification scheme comprising at least an industry class and an industrial process class.

15. A non-transitory computer-readable medium having stored thereon computer-executable components that, in response to execution, cause a computer system including a processor to perform operations, the operations comprising:
storing a plurality of activity templates representing generalized activity sets;
receiving first input selecting a parameter of an activity template of the plurality of activity templates, and second input selecting a controller tag of an industrial controller to map to the parameter of the activity template to yield a bound activity set;
storing the bound activity set as one of a plurality of activity sets, the plurality of activity sets defining respective workflows capable of execution by one or more manufacturing and execution systems (MES);
monitoring availability statuses of machines within an industrial environment;
receiving a message specifying a business objective;
performing multiple simulations representing execution of the business objective using multiple different control scenarios to yield respective simulation results, wherein the performing is based on an organizational model of the industrial environment, and wherein at least one constraint of the multiple simulations is set based on the availability statuses of the set of machines;
matching the message to a selected activity set, of the plurality of activity sets, based on the business objective and one or more comparisons of the respective simulation results; and
executing a workflow defined by the selected activity set.

16. The non-transitory computer-readable medium of claim 15, wherein the matching the activity set is further based on a current control status of a control system responsible for executing control operations of the workflow.

17. The system of claim 1, wherein the simulation component is configured to simulate, as the multiple different control scenarios, execution of the business objective on multiple different machines of the set of machines, and to match the message to the selected activity set based on a determination of which the multiple different control scenarios yields a simulation result that satisfies a defined criterion.

18. The system of claim 1, wherein the simulation component is configured to vary the multiple different control scenarios in terms of at least one of a work shift for carrying out the business objective, a material used to carry out the business objective, a production line on which to carry out the business objective, a machine with which to carry out the business objective, or a facility at which to carry out the business objective.

19. The non-transitory computer-readable medium of claim 15, further comprising rendering the selected activity set as a graphical workflow comprising a set of icons representing executable steps of the selected activity set and at least one connecting line relating at least two icons of the set of icons.

20. The non-transitory computer-readable medium of claim 15, further comprising transforming the message from a first format to a second format compatible with an MES system.

* * * * *